Oct. 20, 1953 L. F. SAMLER 2,656,047
PRESS LOADING AND UNLOADING APPARATUS
Filed Oct. 11, 1948 3 Sheets-Sheet 1
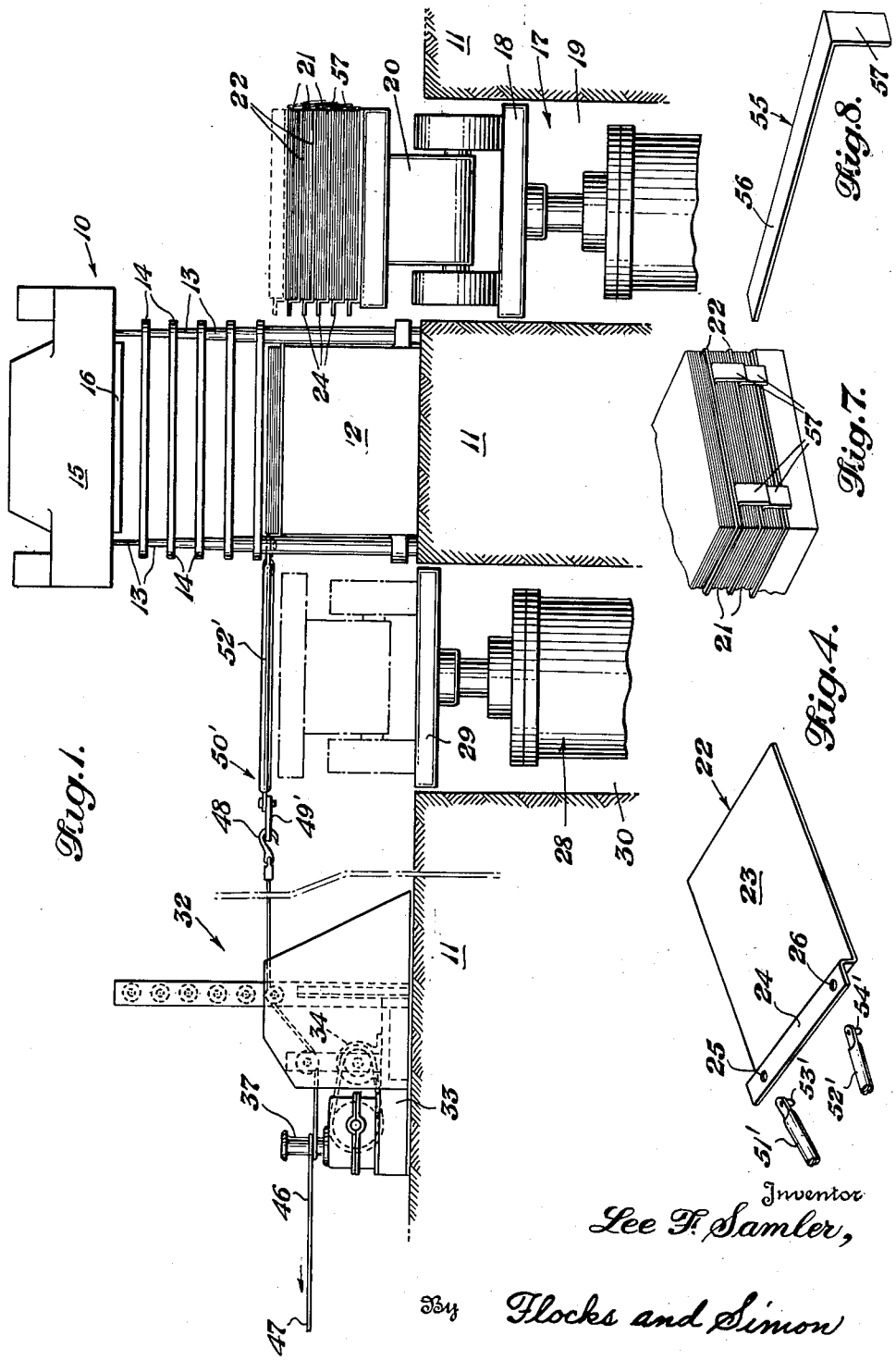
Inventor
Lee F. Samler,
By Flocks and Simon
Attorneys

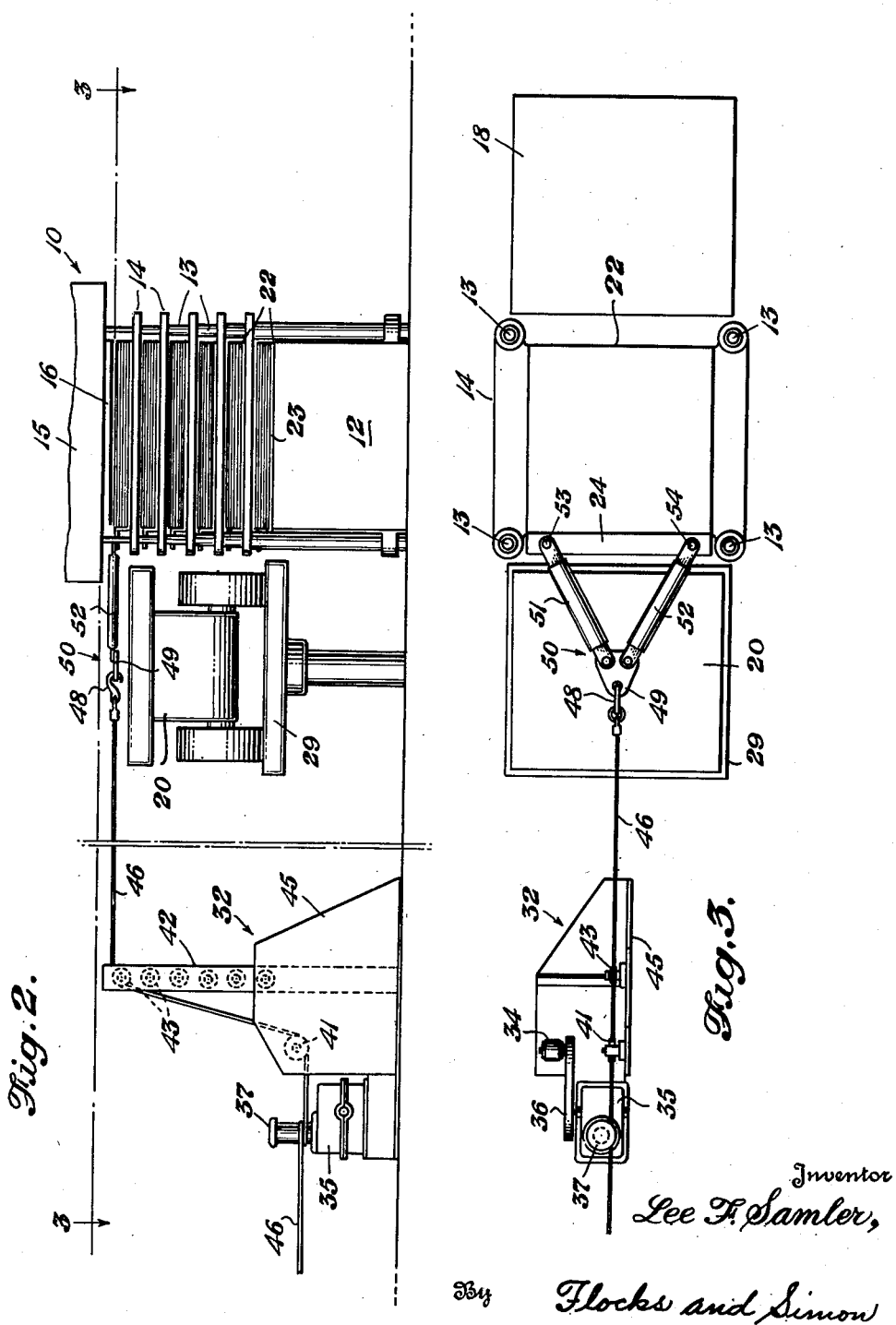

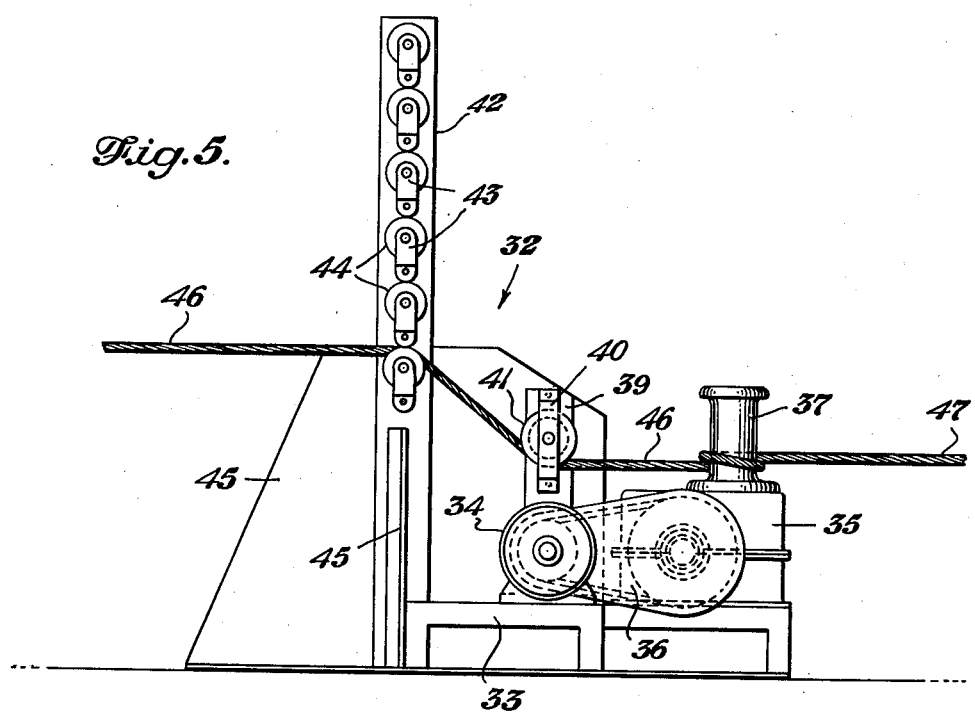
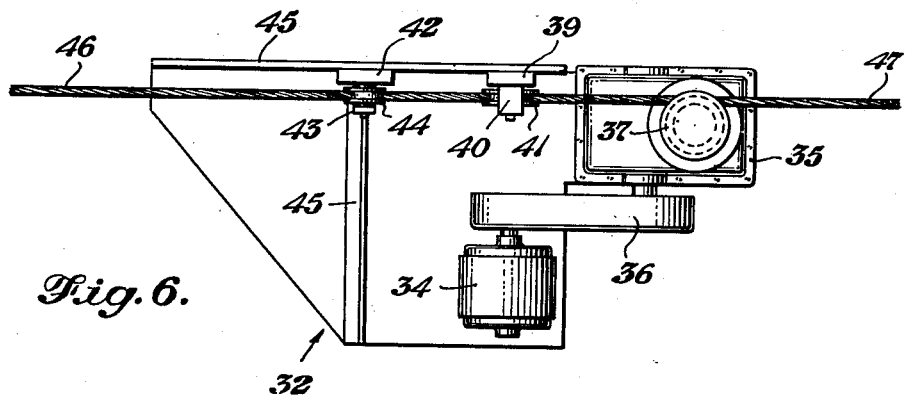

Patented Oct. 20, 1953

2,656,047

UNITED STATES PATENT OFFICE 2,656,047

PRESS LOADING AND UNLOADING APPARATUS

Lee F. Samler, Baltimore, Md., assignor to The National Plastic Products Company, Odenton, Md., a corporation of Maryland Application October 11, 1948, Serial No. 53,835

4 Claims. (Cl. 214—1)

This invention relates to material handling apparatus, and more particularly to loading and unloading apparatus for use with a press.

Laminated sheet material is manufactured by subjecting layers of paper, cardboard or fabric impregnated with phenolic resin to high pressure and temperature. It is common to employ presses for this purpose which have a plurality of platens arranged in tiers so that as many laminated sheets may be simultaneously produced as there are platens in the press. For most purposes it is essential that at least one surface of the finished lamination be perfectly smooth and glossy in appearance. To obtain this finish, the impregnated layers of paper or fabric are arranged on highly polished thin plates of metal and placed between the platens of the press.

It is the present practice to load the platens of the press with impregnated layers of paper or fabric on metal plates by hand. Great difficulties are experienced because of the tendency of the layers during handling to shift in position relative to each other and relative to the metal plate. The layers and plates must also be carefully positioned on the platens at the expense of considerable time and physical effort.

The manual unloading of a press is particularly onerous and time consuming by reason of the hot condition of the finished laminations in addition to the continuous hot condition of the press itself. Heavy asbestos gloves must be worn by the workmen and frequent injury to the finished laminations result from the difficulty of handling them. The manual method of loading and unloading a press takes an inordinate amount of time and seriously limits the productivity of a plant involving a large capital investment and consequent high overhead charge. It is, therefore, the general object of this invention to provide a powered mechanical apparatus for loading and unloading a press.

It is another object to provide an apparatus which is particularly adapted for high-speed loading and unloading of a press having a plurality of platens arranged in tiers.

It is a further object to provide a press loading apparatus operative to accurately position the layers and metal sheets on the platens of the press.

It is a further object to provide a press unloading apparatus operative to deliver the finished layers and metal plates in a neat stack to a portable platform for convenient transportation to the next work station.

It is a further object to provide a press loading and unloading apparatus which does not directly engage the laminations and, therefore, is free from the danger of injuring them.

It is a further object to provide a press loading and unloading apparatus which is easy to control and may be operated by unskilled workmen.

It is a further object to provide an apparatus which is relatively inexpensive to install and operate.

In pursuance of these and other objects which will be apparent to those skilled in the art, a loading elevator is provided on one side of the press, an unloading elevator on the other side of the press and winch means on the side of the unloading elevator opposite from the press. The winch means includes a drum, a plurality of guide rollers each positioned on the level with a different one of the platens of the press, a winch cable engaged with the drum and trainable over any one of the guide rollers, and a Y-shaped link on the free end of the cable. The loading elevator is receptive to a sandwich stack of lamination layers and metal plates provided with ears. In use, the loading elevator is successively positioned so that the Y-shaped link may be engaged with the ears of the metal plates and the winch employed to draw each of the layer and plate assemblies onto a different platen of the press. In unloading the press the unloading elevator is successively positioned to receive the finished laminations and metal plates drawn from the platens by the winch means. In moving a lamination to and from a platen of the press, the winch cable is trained over the corresponding guide roller of the winch means so that only a perfectly horizontal force is applied to the lamination-carrying metal plates.

Other objects and the nature and advantages of the instant invention will be apparent from the following description taken in conjunction with the accompanying drawings, wherein:

Figure 1 is a side elevation of the entire apparatus illustrating the press loading operation, the foundation being broken away to show the elevators set therein;

Figure 2 is a side elevation of a part of the press, the unloading elevator and the winch means illustrating the press unloading operation;

Figure 3 is a sectional view of the apparatus taken on a horizontal plane represented by line 3—3 of Fig. 2, the winch means and unloading elevator being shown in top plan;

Figure 4 is a perspective view of a lamination-carrying polished metal plate and arm end fragments of the Y-shaped link illustrating how they are adapted for interengagement;

Figure 5 is a side elevation of the winch means looking from the side opposite that shown in Figs. 1 and 2;

Figure 6 is a top plan of the same;

Figure 7 is a perspective view of a portion of the stack illustrating the means for preventing movement of successive layers; and Figure 8 is a perspective detail of one of the members for preventing movement of successive layers.

Referring now in greater detail to the drawings, a hydraulic press, generally designated 10, is mounted on a suitable foundation 11 and includes a base block 12, telescoping vertical guide members 13, a plurality of platens 14 arranged in tiers, each platen resting on the shoulders of a set of telescoping sections of the vertical guide members, a ram 15 vertically reciprocable on guide members, not shown, and a ram plate 16. A loading elevator generally designated 17 including an elevator platform 18 is mounted in a pit 19 in the foundation 11. The loading elevator platform 18 is receptive to a cart or dolly 20 carrying a sandwich stack of alternately arranged resin impregnated layers 21 of paper or fabric and polished metal plates 22. The upper side 23 of each metal plate 22 is highly polished to insure a smooth finish on the contiguous surface of the lamination. As shown to advantage in Fig. 4, the metal plates 22 are provided with an offset ear 24 along one edge thereof, the ear having spaced apart apertures 25 and 26 for reasons which will be hereinafter set forth. An unloading elevator, generally designated 28, having a platform 29 is mounted in a pit 30 in the foundation 11. The unloading elevator 28 is beside the press 10 on the side opposite the loading elevator 17. Like the loading elevator 17, the unloading elevator 28 is receptive to a cart or dolly 20 when the elevator platform is level with the foundation 11. The elevators 17 and 28 may be of any conventional type having control means for moving the platforms to any desired level.

Winch means generally designated 32 is mounted on the foundation 11 on the side of unloading elevator 28 opposite from the press 10. The winch means 32 includes a base 33, an electric motor 34 mounted on the base 33, a speed-reducing gear box 35 on the base, pulley-and-belt or sprocket-and-chain means 36 operative to transmit mechanical energy from the motor 34 to the gear box 35 and a cable drum 37 on the top of gear box 35 fixed to the output shaft of the gear box. An upright post 39 secured to the base 33 carries a pulley bracket 40 within which is journaled an idler pulley 41. An upright pulley post 42 secured to the base 33 carries a plurality of pulley brackets 43 within each of which is journaled a guide roller or pulley 44, the brackets 43 being positioned vertically so that the top periphery of each guide roller 44 is on a level with a different one of the platens 14 of hydraulic press 10. Plates 45, 45 serve to brace the posts 39 and 42 relative to the base 33.

The winch means 32 also includes a winch cable or rope 46 looped around the winch drum 37, trained under the idler pulley 41, and trained over any one of the guide rollers 44. The end 47 of the cable or rope 46 is held in the hands of the winch operator. The other end of the cable or rope 46 is engaged with a hook 48.

In Figure 3 the hook 48 is shown engaged with the apertured leg 49 of a Y-shaped (or V-shaped) unloading link 50. The ends of the arms 51 and 52 of the link 50 are provided with hook pins 53 and 54 adapted to enter the apertures 25 and 26 in the ears 24 of metal plates 22. This construction is shown to advantage in Fig. 4. The unloading link 50 is employed when unloading the lamination-carrying metal plates 22 from the press onto the unloading elevator 28. It will be noted from a comparison of Figs. 1 and 3 that a link 50' having longer arms 51' and 52' is employed for loading lamination-carrying metal plates 22 from the loading elevator 17 into the press. The loading link 50' is provided with arms 51' and 52' which are long enough to extend through the press to the loading elevator 17, and the unloading link 50 is provided with shorter arms 51 and 52 so that the winch means 32 may be located relatively close to the unloading elevator 28. The shorter link 50 is also easier to handle. It will, of course, be understood that the apparatus may be arranged so that the same link may be employed for both loading and unloading operations.

It is apparent from Fig. 3 that the elements of the apparatus are so arranged that the winch cable or rope 46 is on the common center line of the unloading elevator 28, the press 10 and the loading elevator 17. It is also apparent that, by the use of a Y-shaped link 50, the lamination-carrying metal plates 22 may be drawn by the winch means 32 in a straight line without danger of the plates 22 becoming skewed in position at any time.

In the operation of the apparatus, the platform 18 of the loading elevator 17 is positioned flush with the foundation 11 and dolly 20 carrying a sandwich stack of alternately arranged resin impregnated layers 21 and polished metal plates 22 is rolled onto the elevator platform. The height of the elevator 17 is then adjusted until the top lamination-carrying metal plate 22 is level with one of the platens 14 of the press 10. The pins 53' and 54' of the Y-shaped link 50' are engaged with the apertures 25 and 26 of the ear 24 of the top plate 22; the cable 46 is trained over the guide roller corresponding with the platen 14, and the end 47 of the winch cable or rope 46 is held taut by the winch operator until the lamination-carrying metal plate 22 is drawn from the loading elevator 17 to a centered position on the platen 14 of press 10. The winch operator can accurately control the pulling force and speed of the winch means by merely varying the friction between the cable or rope 46 and the winch drum 37. The elevator 17 is then moved until the top lamination-carrying metal plate is on a level with another platen 14 of press 10. The process is thus repeated until a lamination-carrying metal plate 22 has been drawn onto each one of the platens 14.

The ram 15 of the press 10 is then lowered and the required heat and pressure is applied through the ram plate 16, platens 14 and base block 12 until the layers of resin impregnated paper or fabric are properly fused. As the ram 15 is raised the platens 14 assume their normal spacing as shown in the drawings.

The unloading elevator 28 with an empty dolly 20 thereon is positioned so that the platform of the dolly is on a level with one of the platens 14 of the press. The Y-shaped link 50 is engaged with the apertured ear 24 of the lamination-carrying metal plate 22 on the platen 14; the cable 46 is trained over the corresponding guide roller 44, and the winch 32 is employed to draw the plate onto the dolly. The elevator 28 is then positioned so that the lamination on the dolly is flush with another platen 14 of the press. The link is engaged with the lamination-carrying plate on the platen and the winch is employed to draw it onto the top of the previously removed lamination on the dolly. This process is repeated until all the lamination-carrying plates 22 are removed from the press 10 and arranged in a neat stack on the dolly. The platform 29 of the unloading elevator 28 is then positioned flush with the foundation 11 and the dolly is moved to the next work station.

Referring to Figs. 7 and 8 of the drawings in particular, it will be noted that each sandwich layer of assembled sheets 21 and plate 22 is separated by separating members 55 each including a portion 56 extending through the stack underneath each plate 22 and also provided with a downwardly turned end 57 which overlies the end of the stack. Successive end portions 57 overlie one another, as best shown in Fig. 7, so that the movement of successive layers 21 is prevented as the topmost layer and corresponding plate are pulled into the press. As each layer is pulled into the press the members 55 underlying the said layer are removed and thereby the movement of the next topmost layer can be effected. The plates 22, therefore, move along the portions 56, the portions 56 functioning as a sort of track, and the carefully assembled material of portions 21 to be laminated are not disturbed or thrown out of alignment, it being understood that the material layers 21 are usually composed of a plurality of impregnated sheets to be laminated into a single sheet in the press.

It will be obvious to those skilled in the art that various changes may be made without departing from the spirit of the invention and therefore the invention is not limited to what is shown in the drawings and described in the specification but only as indicated in the appended claims.

I claim:

1. A lamination handling apparatus for use with a press having a plurality of platens arranged in tiers comprising a winch, a plurality of guide rollers each positioned on a level with a different one of the platens of the press, a winch cable adapted to be trained over any one of the guide rollers, a Y-shaped link secured at its leg to the free end of the winch cable and extending through the said press between said platens, hook pins on the ends of the arms of the link, lamination carrying metal plates provided with spaced apertures along one edge thereof receptive to said hook pins on the link, whereby each of the lamination carrying plates may be drawn onto a platen of the press and accurately positioned thereon and restricting means to prevent movement of successive laminations as the top lamination is drawn on to a plate of the press, said restricting means comprising a plurality of elongated separating means disposed between said laminations.

2. A lamination handling apparatus for use with a press having a plurality of platens arranged in tiers comprising a plurality of polished metal plates provided with spaced apertures along one edge thereof, an elevator on one side of the press receptive to a sandwich stack of laminations and metal plates alternately arranged with the apertured edges of the plates extending beyond the corresponding edges of the laminations, a winch on the side of said press opposite from the elevator, a vertical frame member between the press and winch provided with a plurality of guide rollers each positioned on a level with a different one of the platens of the press, a winch cable adapted to be trained over any one of the guide rollers, a Y-shaped link secured at its leg to the free end of the winch cable, and hook pins on the ends of the arms of the link adapted to engage the metal plates through the spaced apertures therein, whereby the top lamination-carrying metal plate of the sandwich stack on said elevator may be positioned on a level with a platen of the press and the winch with the cable trained over the corresponding guide roller employed to draw the lamination-carrying plate onto the platen and restricting means positioned between said stack of laminations and metal plates to permit movement of successive laminations as the top lamination carrying plate is drawn onto the press platen.

3. An apparatus for use with a sandwich stack of material sheets on polished metal plates and a press, comprising an elevator on one side of the press receptive to the sandwich stack, means including a winch on the side of said press opposite from said elevator, the elevator being operative to position the top sheets and plate of the sandwich stack on a level with the platen of the press and the winch means being operative to draw the top sheets and plate of the sandwich stack onto the platen of the press, and means to prevent movement of successive sheets as said top sheets and plate are drawn from said elevator, said means including a portion for separating each plate from a successive sheet and a second downwardly turned portion overlapping the end of said stack.

4. In a sheet material handling apparatus for use with a press having a plurality of platens arranged in tiers to receive a plurality of stacked layers of sheet material, an elevator positioned beside the press and operative to successively level the top layer of material with a platen of the press, means including a winch and a plurality of rollers on the other side of the press operative to successively draw the top layer of material from the elevator onto a platen of the press, and restricting means positioned between said stacked layers to prevent movement of successive layers as said top layer is drawn from said elevator.

LEE F. SAMLER.

References Cited in the file of this patent

UNITED STATES PATENTS

| Number | Name | Date |
|---|---|---|
| 652,813 | Seiberling | July 3, 1900 |
| 1,308,013 | Hallock | June 24, 1919 |
| 1,876,171 | Rosener | Sept. 6, 1932 |
| 2,072,667 | Coe | Mar. 2, 1937 |
| 2,127,278 | Welch | Aug. 16, 1938 |
| 2,188,374 | Sanchez | Jan. 30, 1940 |
| 2,264,125 | Wolf et al. | Nov. 25, 1941 |
| 2,372,647 | Beane | Apr. 3, 1945 |
| 2,390,159 | Laucks et al. | Dec. 4, 1945 |
| 2,421,128 | Pride | May 27, 1947 |
| 2,497,149 | Berdis et al. | Feb. 14, 1950 |

FOREIGN PATENTS

| Number | Country | Date |
|---|---|---|
| 262,856 | Great Britain | Dec. 16, 1926 |
| 433,778 | Great Britain | Aug. 15, 1935 |